(12) United States Patent
Sato (10) Patent No.: US 7,512,791 B1
(45) Date of Patent: Mar. 31, 2009

(54) COMMUNICATION APPARATUS AND METHOD FOR DISCRIMINATING CONFIDENTIALITY OF RECEIVED DATA

(75) Inventor: Eiichi Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 791 days.

(21) Appl. No.: 09/713,104

(22) Filed: Nov. 15, 2000

(30) Foreign Application Priority Data

Nov. 16, 1999 (JP) ............................ 11-325559
Oct. 24, 2000 (JP) ............................ 2000-323980

(51) Int. Cl.
| H04L 9/00 | (2006.01) |
| G06F 12/14 | (2006.01) |
| G06F 15/16 | (2006.01) |
| H04K 1/00 | (2006.01) |
| H04N 1/44 | (2006.01) |

(52) U.S. Cl. ................ 713/166; 713/150; 713/168; 713/189; 726/3; 726/27; 380/243; 380/255; 705/51

(58) Field of Classification Search ............... 713/166, 713/165, 162, 200, 201
See application file for complete search history.

(56) References Cited

U.S. PATENT DOCUMENTS

| 4,357,529 A | * | 11/1982 | Atalla .......................... 705/72 |
| 4,882,779 A | * | 11/1989 | Rahtgen ........................ 705/72 |
| 5,539,826 A | * | 7/1996 | Dwork et al. ................... 713/169 |
| 5,633,932 A | * | 5/1997 | Davis et al. ................... 713/176 |
| 5,642,420 A | | 6/1997 | Kuroda et al. .................. 380/30 |
| 5,659,618 A | * | 8/1997 | Takahashi et al. ............ 380/255 |
| 5,765,170 A | * | 6/1998 | Morikawa ..................... 707/200 |
| 5,884,246 A | * | 3/1999 | Boucher et al. ................ 704/2 |
| 5,901,227 A | * | 5/1999 | Perlman ........................ 713/157 |
| 5,937,069 A | | 8/1999 | Nagai et al. |
| 5,969,632 A | * | 10/1999 | Diamant et al. ................ 340/5.3 |
| 6,101,320 A | * | 8/2000 | Schuetze et al. ............... 709/206 |
| 6,105,027 A | * | 8/2000 | Schneider et al. .............. 707/9 |
| 6,167,513 A | * | 12/2000 | Inoue et al. ................... 713/150 |
| 6,268,789 B1 | * | 7/2001 | Diamant et al. ............. 340/5.74 |
| 6,324,650 B1 | * | 11/2001 | Ogilvie ........................ 713/202 |
| 6,363,480 B1 | * | 3/2002 | Perlman ........................ 713/164 |
| 6,377,949 B1 | * | 4/2002 | Gilmour ........................ 707/10 |
| 6,385,727 B1 | * | 5/2002 | Cassagnol et al. ............. 713/193 |

(Continued)

FOREIGN PATENT DOCUMENTS

EP   0 360 732   3/1990

(Continued)

OTHER PUBLICATIONS

Gersho, Allen Perfect Secrecy Encryption of Analog Signals, 1984, IEEE, pp. 460-466.*

(Continued)

*Primary Examiner*—Christopher A Revak
*Assistant Examiner*—Aravind K Moorthy
(74) *Attorney, Agent, or Firm*—Cowan, Liebowitz & Latman, P.C.

(57) ABSTRACT

The invention provides a communication apparatus for transferring data received from a first network to a second network, in which the apparatus judges the destination of transfer of the received data and the secrecy level of the received data, and executes the transfer of the received data by a method based on the results of judgment.

5 Claims, 11 Drawing Sheets

U.S. PATENT DOCUMENTS

| | | | | |
|---|---|---|---|---|
| 6,393,465 | B2* | 5/2002 | Leeds | 709/207 |
| 6,591,273 | B2* | 7/2003 | Jenkins et al. | 707/102 |
| 6,657,643 | B1* | 12/2003 | Horvitz et al. | 715/764 |
| 6,658,568 | B1* | 12/2003 | Ginter et al. | 713/193 |
| 6,678,822 | B1* | 1/2004 | Morar et al. | 713/182 |
| 6,718,367 | B1* | 4/2004 | Ayyadurai | 709/206 |
| 6,826,609 | B1* | 11/2004 | Smith et al. | 709/225 |
| 6,832,224 | B2* | 12/2004 | Gilmour | 707/100 |
| 6,883,014 | B1* | 4/2005 | McErlean | 709/202 |
| 6,963,419 | B2* | 11/2005 | Tanimoto | 358/1.15 |
| 7,010,681 | B1* | 3/2006 | Fletcher et al. | 713/154 |
| 7,020,774 | B1* | 3/2006 | Cornuejols et al. | 713/176 |
| 2006/0001899 | A1* | 1/2006 | Kanno | 358/1.14 |
| 2006/0028677 | A1* | 2/2006 | Isshiki et al. | 358/1.15 |
| 2007/0052730 | A1* | 3/2007 | Patterson et al. | 345/634 |
| 2008/0170686 | A1* | 7/2008 | Nemoto et al. | 380/42 |
| 2009/0002150 | A1* | 1/2009 | Zilberstein et al. | 340/531 |
| 2009/0016357 | A1* | 1/2009 | Blevins et al. | 370/395.53 |

FOREIGN PATENT DOCUMENTS

| | | |
|---|---|---|
| EP | 0 438 154 | 7/1991 |
| EP | 985995 A1 * | 3/2000 |
| EP | 1445939 A2 * | 8/2004 |
| EP | 1944942 A1 * | 7/2008 |
| JP | 57136865 | 8/1982 |
| JP | 10070643 | 3/1998 |

OTHER PUBLICATIONS

Okamoto, Eiji, Proposal for Integrated Security Systems, 1992, IEEE, pp. 354-358.*

Schneier et al, An Improved E-Mail Security Protocol, 1997, IEEE, pp. 227-230.*

Messmer, Ellen, Encryption Restrictions, 2004, Network World, p. 69.*

Bruce Schneier, Applied Cryptography, 1996, John Wiley & Sons, Inc., Second Edition, pp. 4-5.*

European Office Action dated Jan. 25, 2007 issued in the counterpart European Patent Application 00124940.8.

* cited by examiner

| SUB ADDRESS | DESIGNATION E-MAIL ADDRESS | MAIL BOX |
|---|---|---|
| 0123 | aaa@canon.canon.com | 01 |
| 4567 | bbb@canon.canon.com | 02 |
| 8901 | ccc@canon.canon.com | 03 |
| 2345 | ddd@canon2.canon.com | 04 |
| 6789 | eee@canon2.canon.com | 05 |

FIG. 7

| DESIGNATION NAME | E-MAIL ADDRESS | PUBLIC KEY |
|---|---|---|
| aaa | aaa@canon.canon.com | NONE |
| bbb | bbb@canon.canon.com | PUBLIC KEY bbb |
| ccc | ccc@canon.canon.com | NONE |
| ddd | ddd@canon2.canon.com | NONE |
| eee | eee@canon2.canon.com | PUBLIC KEY eee |

COMMUNICATION APPARATUS AND METHOD FOR DISCRIMINATING CONFIDENTIALITY OF RECEIVED DATA

BACKGROUND OF THE INVENTION

1. Field of the Invention

The present invention relates to a communication apparatus suitable for transferring the received secret data.

2. Related Background Art

Owing to the recent remarkable popularization of the internet, the facsimile device which has executed communication only through the public network is now becoming to be connected to a computer network such as a LAN (local area network).

Such facsimile device adaptable to multi-lines, connectable to the public network and the LAN, upon receiving image data from another facsimile device through the public network, transfers such image data to a server computer through the LAN.

The user acquires the image data by accessing to the server computer from a client computer. The acquired image data can displayed and viewed on a CRT by a predetermined viewer software. Otherwise the image data can be printed and observed by a printer connected to the client computer.

In the facsimile communication, there is known a confidential function. In such function, the facsimile apparatus does not immediately print the image received under the designation of a confidential transmission but stores the image in a memory, and prints such image from the memory in response to the input of a predetermined password. Thus the image can be viewed only by the user who knows the confidential password.

However, as the conventional facsimile device described above is not provided with a configuration for transferring the confidential image, the intended recipient user of the confidential image has to go to the location of such facsimile device and to have the confidential image to be printed by the entry of the password.

SUMMARY OF THE INVENTION

In consideration of the foregoing, an object of the present invention is to provide a communication apparatus capable of transferring the received confidential image to a predetermined destination while maintaining its confidential character, and a method and a memory medium therefor.

Other objects of the present invention, and the features thereof, will become fully apparent from the following detailed description which is to be taken in conjunction with the accompanying drawings.

DESCRIPTION OF THE PREFERRED EMBODIMENTS

Now the present invention will be clarified in detail by preferred embodiments thereof, with reference to the accompanying drawings.

Figure 1:
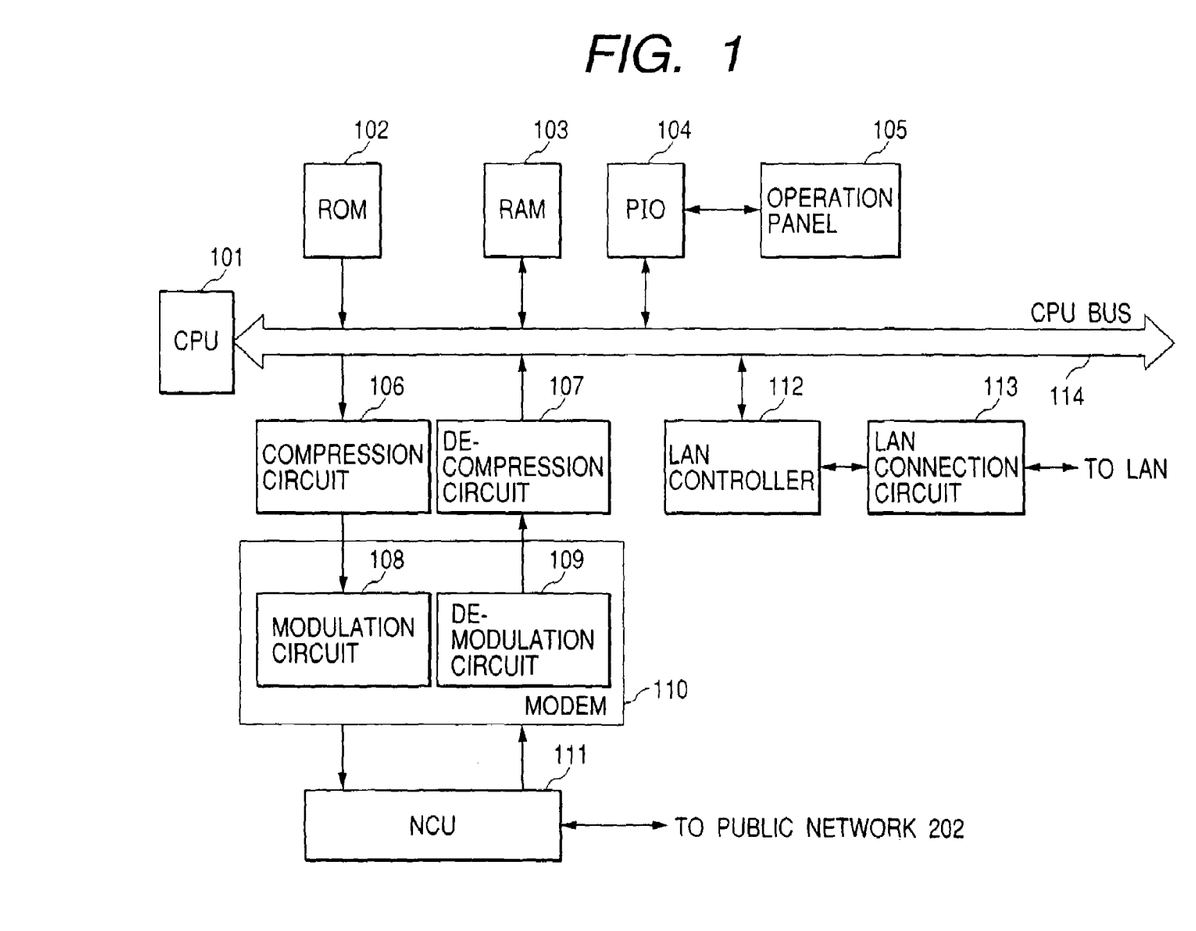
FIG. 1 is a view showing the configuration of a communication apparatus constituting a first embodiment of the present invention.

FIG. 1 is a block diagram showing the configuration of a communication apparatus of the present invention, wherein shown are a CPU 101 for controlling the entire apparatus, ROM 102 storing control programs to be executed by the CPU 101, and RAM 103 constituting a temporary storage area for the data. A part of the RAM is constructed as a non-volatile memory backed up by a battery or the like, and serving to store data to be retained even after the power supply of the apparatus is turned off, such as registration data and management tables required in the present embodiment. Such non-volatile memory may also be replaced by a hard disk.

There are also provided an PIO 104 for data input/output with external circuits, an operation panel 105 controlled by the PIO 104, a compression circuit 106 for compressing data, a decompression circuit 107 for decompressing the data, a modulation circuit 108 for converting data into an analog signal of audible range for transmission to a public network 202, a demodulation circuit 109 for demodulating the analog signal, received from the public network 202, into a digital signal, a MODEM 110 consisting of the modulation circuit 108 and the demodulation circuit 109, an NCU 111 for connecting the present apparatus with the public network 202, a LAN controller 112 relating to the protocol for transmitting the signal to the LAN, a LAN connection circuit 113 to be used for matching the level of the signal in the present apparatus with that on the NCU, and a CPU bus 114 to be used for the control by the CPU 101.

Figure 2:
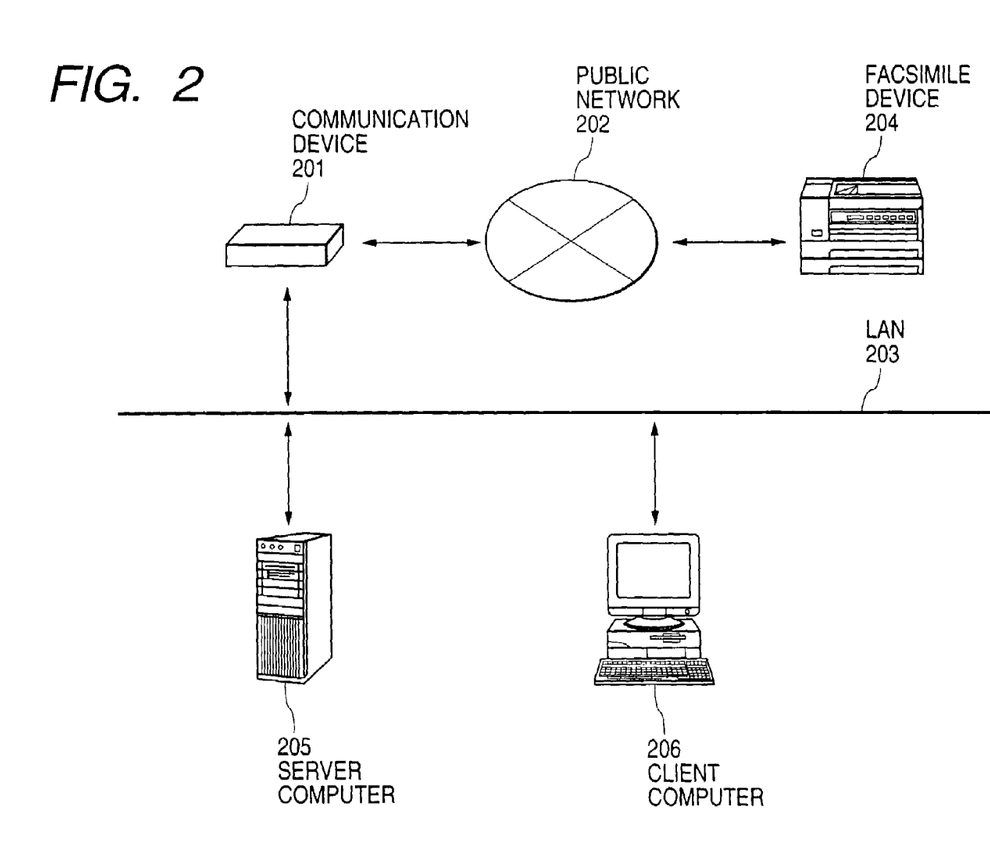
FIG. 2 is a view showing a network system in the first embodiment of the present invention.

FIG. 2 illustrates a network system to which the communication apparatus 201 of the present invention is connected. Referring to FIG. 2, the communication apparatus 201 is connected to a public network 202 and a LAN 203. On the LAN 203, there are connected a server computer 205 to be used for example for storing the received image data, and a client computer 206 capable of information exchange with the server computer 205. The server computer 205 is provided with e-mail server functions such as SMTP server function and POP server function, and is so constructed as to be capable of exchanging e-mail with the communication apparatus 201, the client computer 206 and other unrepresented terminals. The communication apparatus 201 and the client computer 206 are naturally provided with an e-mail client function.

The communication apparatus 201 executes facsimile communication with the facsimile device 204 through the public network 202.

First Embodiment

In a configuration where the communication apparatus 201 transmits image data received from the public network 202 to the server computer 205 for storage in a predetermined area, the first embodiment selectively executes the encryption of the image data according to whether the received image data represent a confidential image.

In case the received image data represent a confidential image, the image data are encrypted by a predetermined method and stored thereby being rendered observable only by a specified user. Thus the received confidential image can be transferred while the confidentiality of the data are retained.

Figure 3:
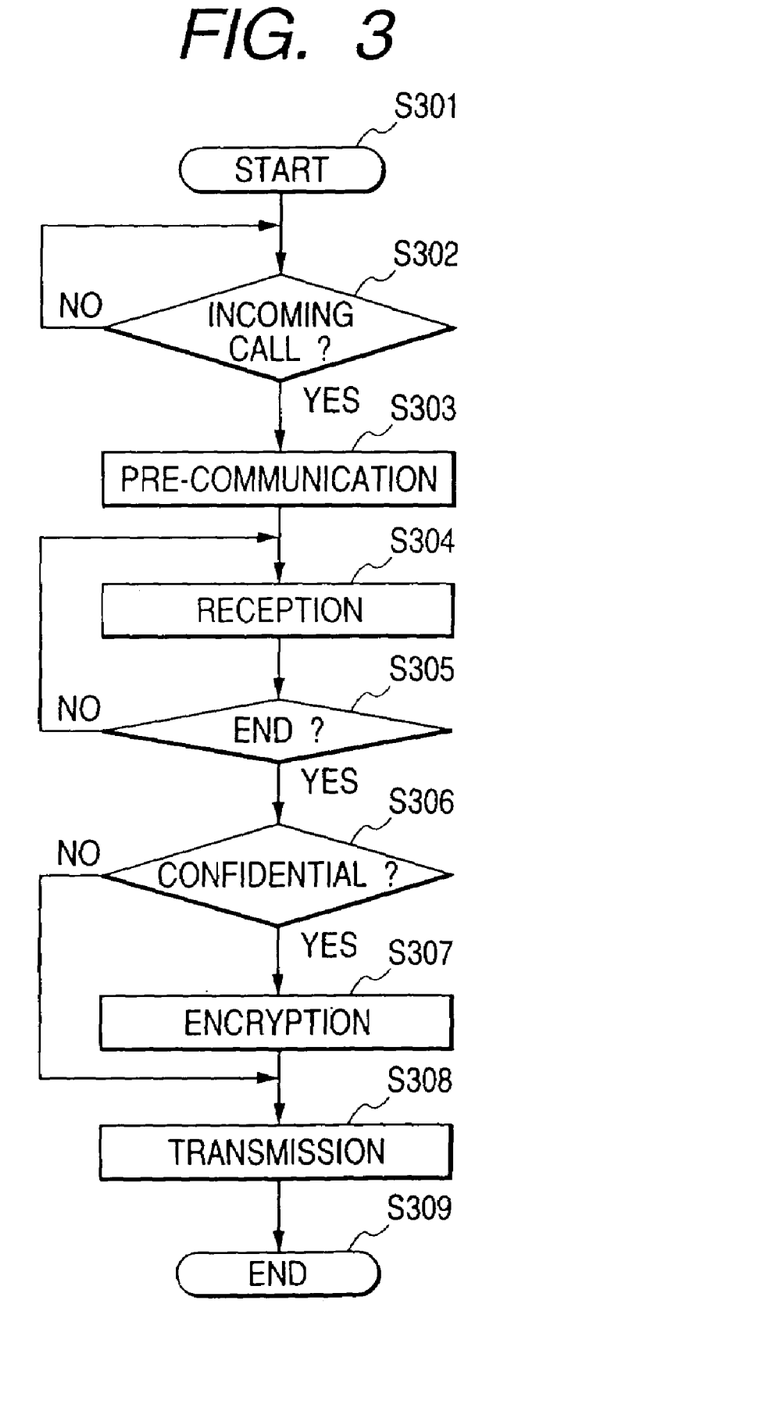
FIG. 3 is a flowchart showing the function of the communication apparatus of the first embodiment of the present invention.

In the following there will be explained the function of the communication apparatus 201 of the present embodiment, with reference to a flowchart shown in FIG. 3. The sequence is started after the power supply to the communication apparatus 201 is turned on (step S301) and there is entered a state of awaiting a call reception from the public network 202 (step S302). If a call is made from the facsimile device 204 while the call reception is awaited, the call reaches and is received by the communication apparatus 201 through the public network 202. When the call is detected by the CPU 101 and the NCU 111, the call is established by the NCU 111.

Then there is entered a phase B based on the ITU-T recommendation T.30 for executing a training for exchanging the information on communication ability and investigating the quality of the communication line (hereinafter represented as pre-communication). In the pre-communication (step S303), there are informed information such as the aforementioned sub-address (by SUB signal in ITU-T T.30), a password (by PWD signal in ITU-T TT.30) in case of a confidential image, a confidential box number etc. Such information are temporarily stored in the RAM 103 of the communication apparatus 201.

After the pre-communication (step S303), there is executed reception of image data (step S304). The image signal transmitted through the public network 202 is fetched into the communication apparatus 201 through the NCU 111, then returned to the original image data through the demodulation circuit 109 of the MODEM 110 and by the decompression circuit 107, and stored in a predetermined data format (which may be compressed data) in the RAM 103 by the CPU 101. Such receiving operation is repeated until an end notice arrives from the transmitting side (step S305).

After the reception of the image data, there is discriminated whether the image is a confidential image by reading the information stored in the aforementioned RAM 103 (step S306). This discrimination may be made by whether the aforementioned PWD signal is received, or by whether the use of the confidential function is designated on a protocol signal such as the NSS signal.

In case the image data represent a confidential image, the image data stored in the RAM 103 are read by the CPU 101 and encrypted (step S307). The communication apparatus 201 executes encryption by an encryption key corresponding to the server computer 205.

The encrypted image data are transmitted to the LAN controller 112, and to the LAN 203 through a LAN connection circuit 113, thereby transferring to the server computer 205 (step S308). Also the CPU 101 transmits the password and the confidentiality box number obtained in the pre-communication (step S303) to the server computer 205, whereupon the communication apparatus 201 terminates the sequence (step S409).

In case the step S306 identifies that the image data do not represent a confidential image, the encrypting step S307 is skipped and the image data are transferred without encryption to the server computer 205 (step S308) whereupon the communication apparatus 201 terminates the sequence (step S309).

Upon receiving the image data transferred in the step S308, the server computer 205 stores such image data as a file in a memory area thereof and transmits a reception notice to the client computer 206 of a specified user based on the sub-address. Such notice is made for example by e-mail.

In case the image data do not represent a confidential image, the user receiving the notice manipulates the client computer 206 for acquiring the image data addressed to the user from the server computer 205 for example by downloading, thereby being enabled to acquire the image data as visible information, for example by display on the client computer 206 with an image viewer application or by printing with an unrepresented printer device.

On the other hand, in case the image data represent a confidential image so that the image data stored in the server computer 205 are encrypted, it is necessary to transmit a password corresponding to the confidentiality box number to the server computer 205 when the client computer 206 downloads the image data from the server computer 205. Only in the case where server computer 205 judges that the password is proper, it transmits the decrypted image data to enable viewing thereof on the client computer 206.

Second Embodiment

In a configuration where the communication apparatus 201 transmits image data received from the public network 202 to the server computer 205 for storage in a predetermined area, the second embodiment does not execute such storage but transfers the image data to the designated destination by e-mail in case the received image data represent a confidential image.

In case the received image data represent a confidential image, the image data are directly e-mail transferred to the destination without storage in the memory of the server computer 205, whereby the received confidential image can be transferred while the confidentiality of the data are retained.

Figure 4:
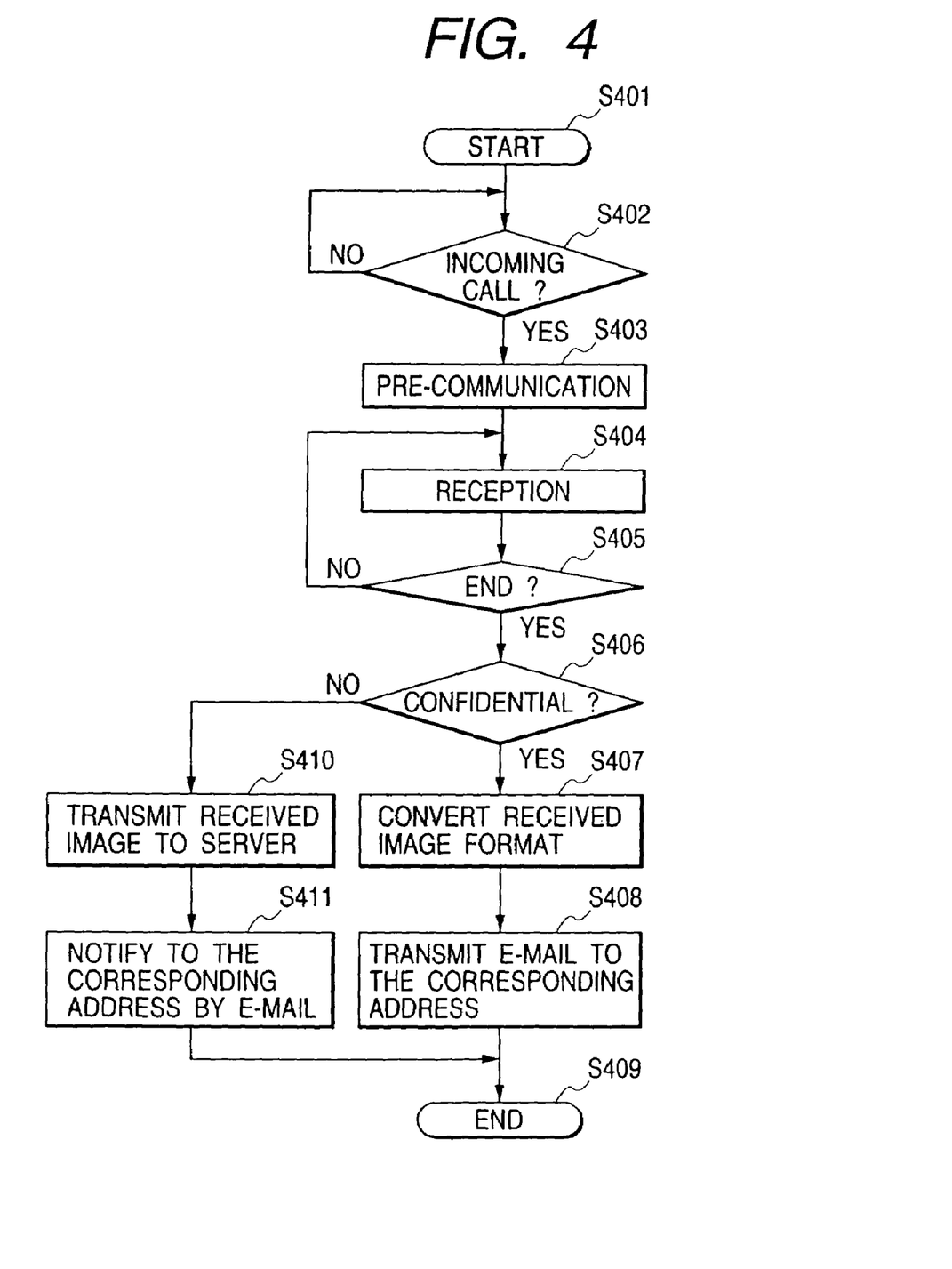
FIG. 4 is a flowchart showing the function of the communication apparatus in a second embodiment of the present invention.

In the following there will be explained the function of the communication apparatus 201 of the present embodiment, with reference to a flowchart shown in FIG. 4. As the process of steps S401 to S405 have already been explained in the step S301 to S305 of the foregoing first embodiment, the sequence will be explained as follows from step S406.

At first, it is discriminated whether the image data received in the step S405 represents a confidential image, by reading the information stored in the aforementioned RAM 103 (step S406), and, if a confidential image is represented, the CPU 101 reads the image data stored in the RAM 103 and converts the image data into an image format (JPEG, GIF etc.) developable by the client computer 206 (step S407). Then the CPU 101 specifies the client computer 206 at the address of transfer by the sub-address, and sends an e-mail (step S408). In this operation, the image data converted to the image format is attached to the e-mail, whereby the delivery of the confidential image to the specified user by e-mail is realized. After the transmission of the e-mail to which attached are the image data converted into the image format, the communication apparatus 201 terminates the sequence (step S409).

In the case where step S406 identifies that the received image data do not represent a confidential image, the image data are transferred to the server computer 205 (step S410) whereupon the communication apparatus 201 terminates the sequence (step S409). The server computer 205 stores such image data as a file in a memory area thereof and transmits a reception notice to the client computer 206 of a specified user based on the sub-address. Such notice is made for example by e-mail. Upon receiving the notice, the user manipulates the client computer 206 for acquiring the image data addressed to the user from the server computer 205 for example by downloading, thereby being enabled to acquire the image data as visible information, for example by display on the client computer 206 with an image viewer application or by printing with an unrepresented printer device.

Third Embodiment

In transferring the received confidential image by e-mail, the third embodiment selectively executes encryption based on whether a public key of the destination of transfer is acquired.

More specifically, in case the communication apparatus 201 has acquired the public key of the destination of transfer of the confidential image, the received image data are transferred by an e-mail encrypted with such public key. In the case where communication apparatus 201 has not acquired the public key of the destination of transfer of the confidential image, such confidential image is not transferred but is stored in a memory box managed by the communication apparatus 201, and an e-mail only describing that the received confidential image is stored in the memory box is transmitted to the destination of transfer.

In the public key system, the encrypting key at the transmitting side is different from the decrypting key at the receiving side, in which one of the keys is made public (public key) while the other is kept secret (secret key). The user, receiving a confidential image encrypted with his public key, can view the confidential image by decryption with the secret key held by the user only.

In this manner it is rendered possible to prevent unexpected disclosure of the confidential image without encryption onto the LAN, thereby maintaining the confidentially of the confidential image.

Figure 6:
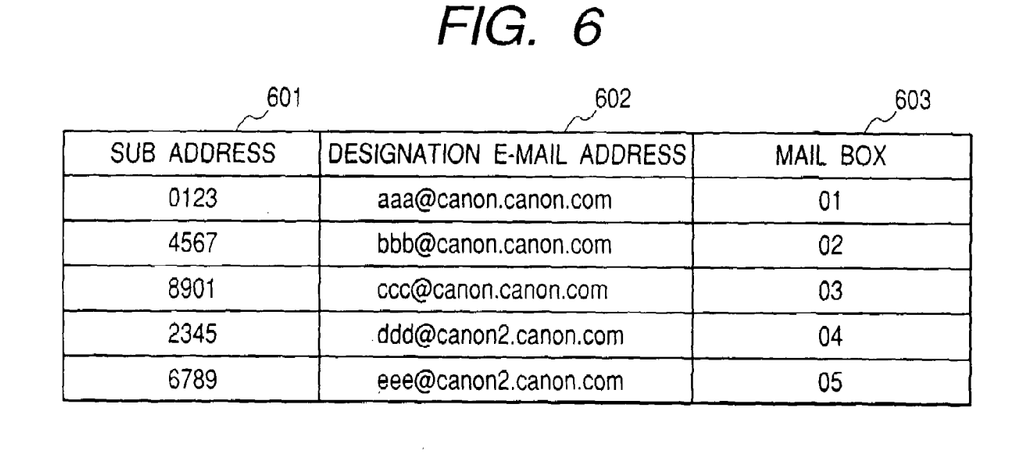
FIG. 6 is a view showing the data structure of a management table indicating the correspondence between sub-addresses and electronic mail addresses in the third embodiment of the present invention.

FIG. 6 shows a management table held by the communication apparatus 201 and storing the correspondence between the sub-address data and the e-mail addresses of the destinations of transfer. The table stores the e-mail addresses of the destinations of data and the confidentiality box numbers for the sub-address data 601 in mutual correspondence.

Figure 7:
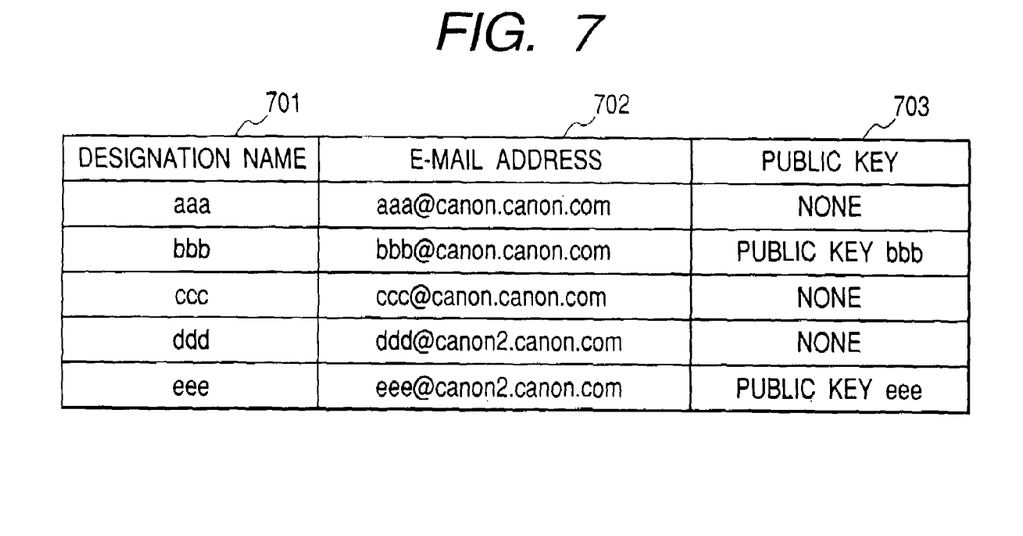
FIG. 7 is a view showing the data structure of an address notebook in the third embodiment of the present invention.

FIG. 7 shows, in the form of a table, the data structure of an address notebook in the e-mail client function of the communication apparatus 201. As shown in FIG. 7, for each address, there are shown a destination name 701, an e-mail address 702 and information 703 whether the public key of such destination is obtained. The public key data are acquired in advance from each destination through the LAN, or from a detachable memory medium by providing the communication apparatus 201 with a function of connecting a device capable of driving such memory medium. The acquired public key data are stored as file data, and the acquired public key data and the destination are correlated in the address notebook through a predetermined procedure.

Also in acquiring the public key, it is preferable also to confirm the appropriateness of the public key by receiving a certificate certifying that the public key is of the proper owner from a predetermined certifying organization and then to register the public key in the aforementioned address notebook.

In the following, the present embodiment will be explained with reference to FIGS. 6 and 7.

At first, when the sub-address "0123" receives the designated image data from the public network 202, the e-mail address of the destination of transfer is converted into "aaa@xxx.xxx.com" based on the management table shown in FIG. 6, and the presence/absence of the public key is judged, based on the e-mail address of the destination of transfer in the address notebook shown in FIG. 7.

In the example shown in FIGS. 6 and 7, the confidential images designated for the sub-addresses "0123" and "8901" are respectively stored in the corresponding memory boxes "01" and "03" since the public keys are not acquired, and e-mails describing the storing confidentiality box number, the transmitter information and the time and date of reception as text data are transferred to the respective destinations "aaa@xxx.xxx.com" and "ccc@xxx.xxx.com".

The confidential image designated for the sub-address "5678", for which the public key has been acquired, is encrypted with such public key and is transferred to the destination "bbb@xxx.xxx.com".

Also in the case where received image data do not represent a confidential image, the received image data are transferred by e-mail, without encryption, to the e-mail address of the destination corresponding to the sub-address.

Figure 5:
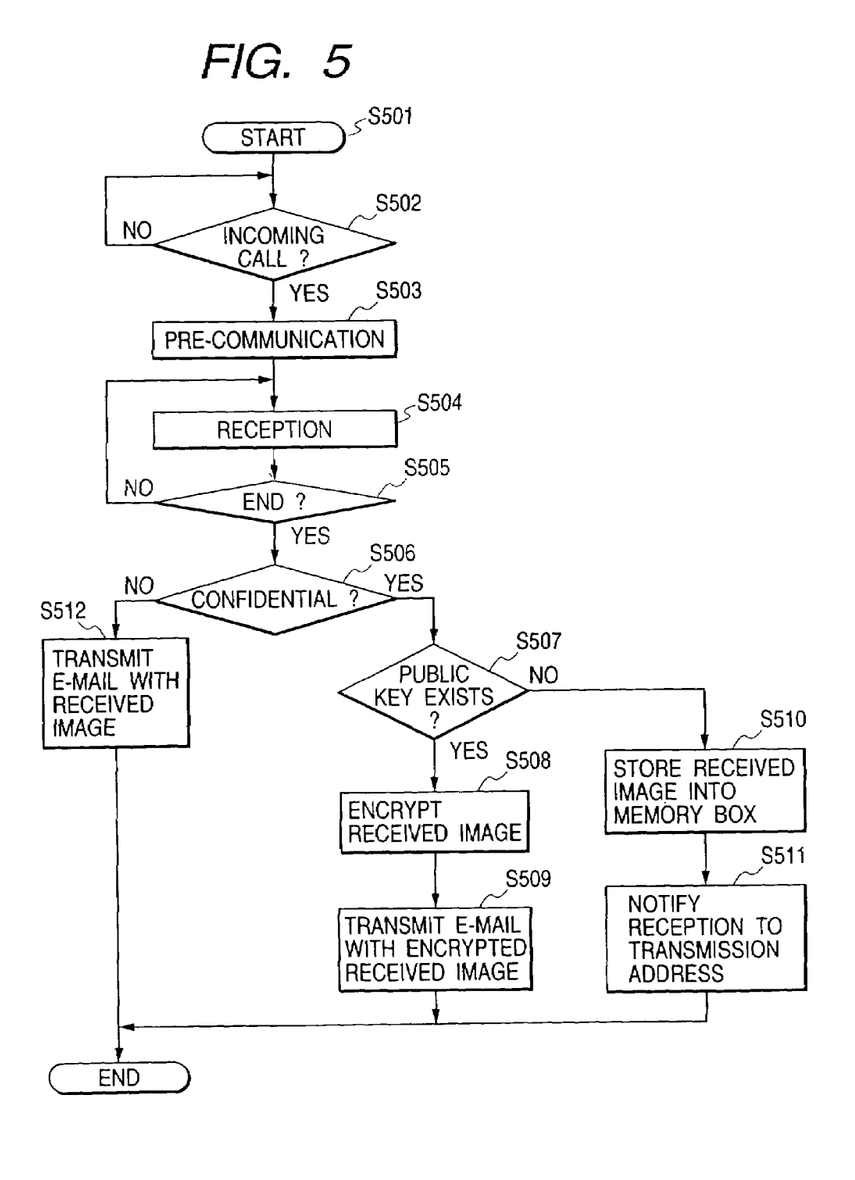
FIG. 5 is a flowchart showing the function of the communication apparatus in a third embodiment of the present invention.

FIG. 5 is a flowchart showing the function of the communication apparatus 201 in the present embodiment. As the process of steps S501 to S505 have already been explained in the steps S301 to S305 of the foregoing first embodiment, the sequence will be explained in the following from a step S506.

At first a step S506 discriminates whether the image data received in the step S504 represent a confidential image, and, if not, the sequence proceeds to a step S512 for transmitting an e-mail with the received image data as an attachment to the e-mail address of the destination corresponding to the sub-address received in the step S503.

A step S507 discriminates, based on the management table shown in FIG. 6 and the address notebook shown in FIG. 7, whether the public key is correlated with the e-mail address corresponding to the sub-address received in the step S503. If the public key is not correlated, the sequence proceeds to a step S510 for storing the received image data in a memory box corresponding to the sub-address. Then a step S511 transmits, to the e-mail address corresponding to the sub-address, an e-mail describing, as text data, a message that the confidential image is stored in the memory box. An example of the message is "A confidential image is received in your memory box. Please come to receive it".

The receiver of the confidential image, receiving the e-mail describing the above-mentioned message, visits the location of the communication apparatus 201 and enters a password corresponding to the memory box from the operation panel 10, whereby the confidential image is outputted from the unrepresented printer. In this manner it is rendered possible to prevent unexpected disclosure of the confidential image without encryption onto the LAN, thereby maintaining the confidentiality of the confidential image.

In the case where step S507 identifies that the public key is correlated, the sequence proceeds to a step S508 for encrypting the received image data with such public key, and then a step S509 transfers an e-mail with the confidential image encrypted in the step S509. An example of the encrypting method based on the public key is RSA (Rvert-Shamir-Adleman) system.

The above-described process allows secure encryption in transferring the confidential image received from the public network through a LAN thereby enabling to maintain the confidentiality of the confidential image.

Among the encryption systems, there is also known a common key system, in addition to the aforementioned public key system. In such common key system, the encrypting key at the transmitting side is same as the decrypting key at the receiving side. The transmitting side executes transmission by encrypting the communication text (plaintext) by such encrypting key, and the receiving side decrypts the received text (encrypted text) with the same key.

As the public key system generally requires a longer time in comparison with the common key system, because the encryption and the decryption are more complex, it is also possible to transfer data obtained by encrypting the confidential image by a common key generated by a predetermined algorithm and data obtained by encrypting such common key by the public key of the destination of transfer. An encryption system based on the common key is DES (data encryption standard) system.

Fourth Embodiment

In the foregoing third embodiment, the receiver of the confidential image stored in the memory box in the step S510 is assumed to visit the communication apparatus 201 for obtaining the printed output. In the present embodiment, after the confidential image is stored in the memory box, in response to the registration of the public key of the destination of transfer of the confidential image in the aforementioned address notebook, such confidential image is automatically encrypted with such public key and transferred to the destination.

Consequently the receiver of the confidential image, without visiting the location of the communication apparatus 201, can acquire the confidential image stored in the memory box, by causing the system manager to register the public key or by sending the public key to the communication apparatus 201 through the LAN 203.

Figure 9:
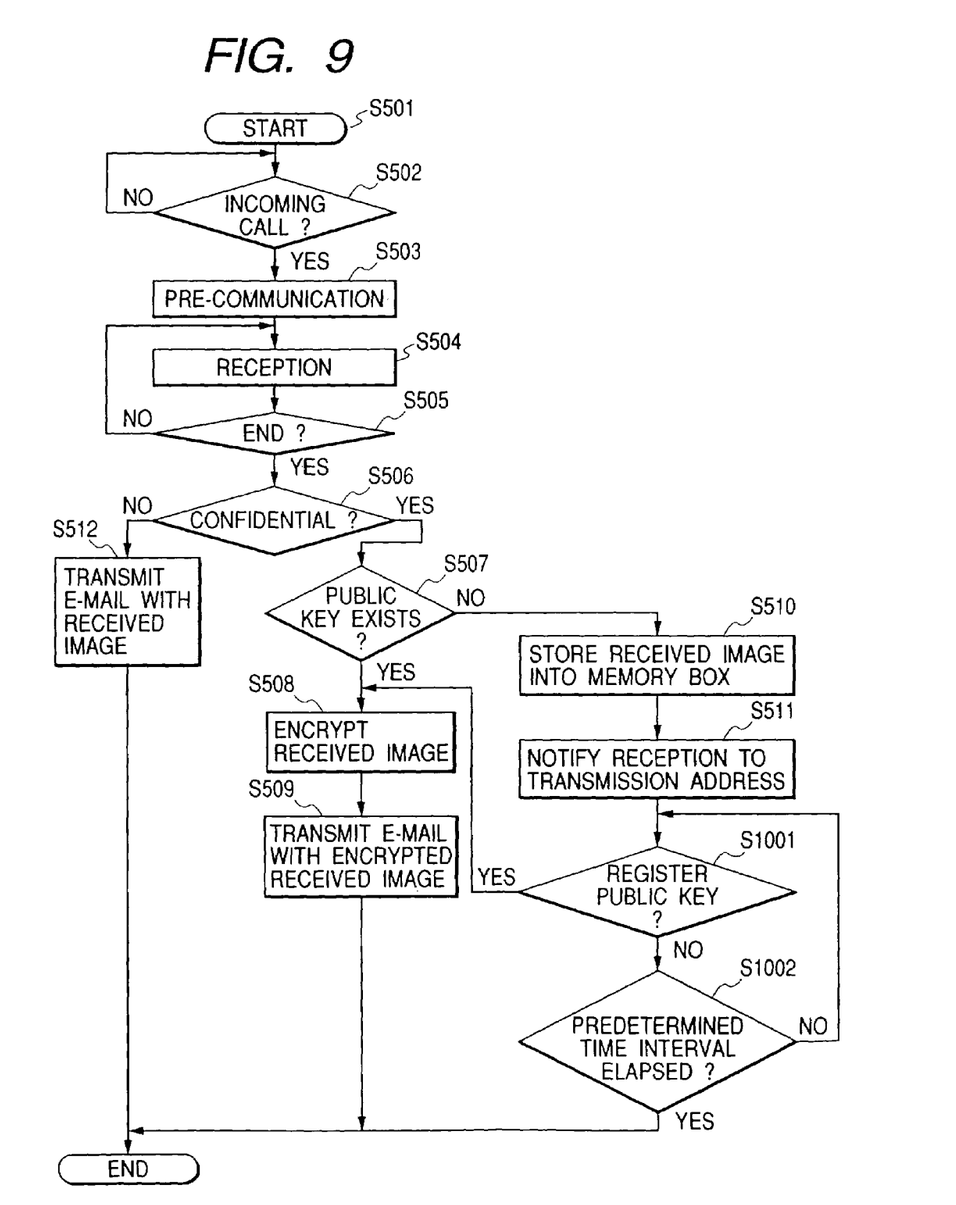
FIG. 9 is a flowchart showing the function of the communication apparatus in a fourth embodiment of the present invention.

In the following, the function of the communication apparatus 201 in the present embodiment will be explained with reference to a flowchart shown in FIG. 9, which is a modification of the flowchart of the third embodiment and in which any step of a similar number as in the third embodiment has the same content. In the following there will only be explained steps of which processes are different from the third embodiment.

Figure 10:
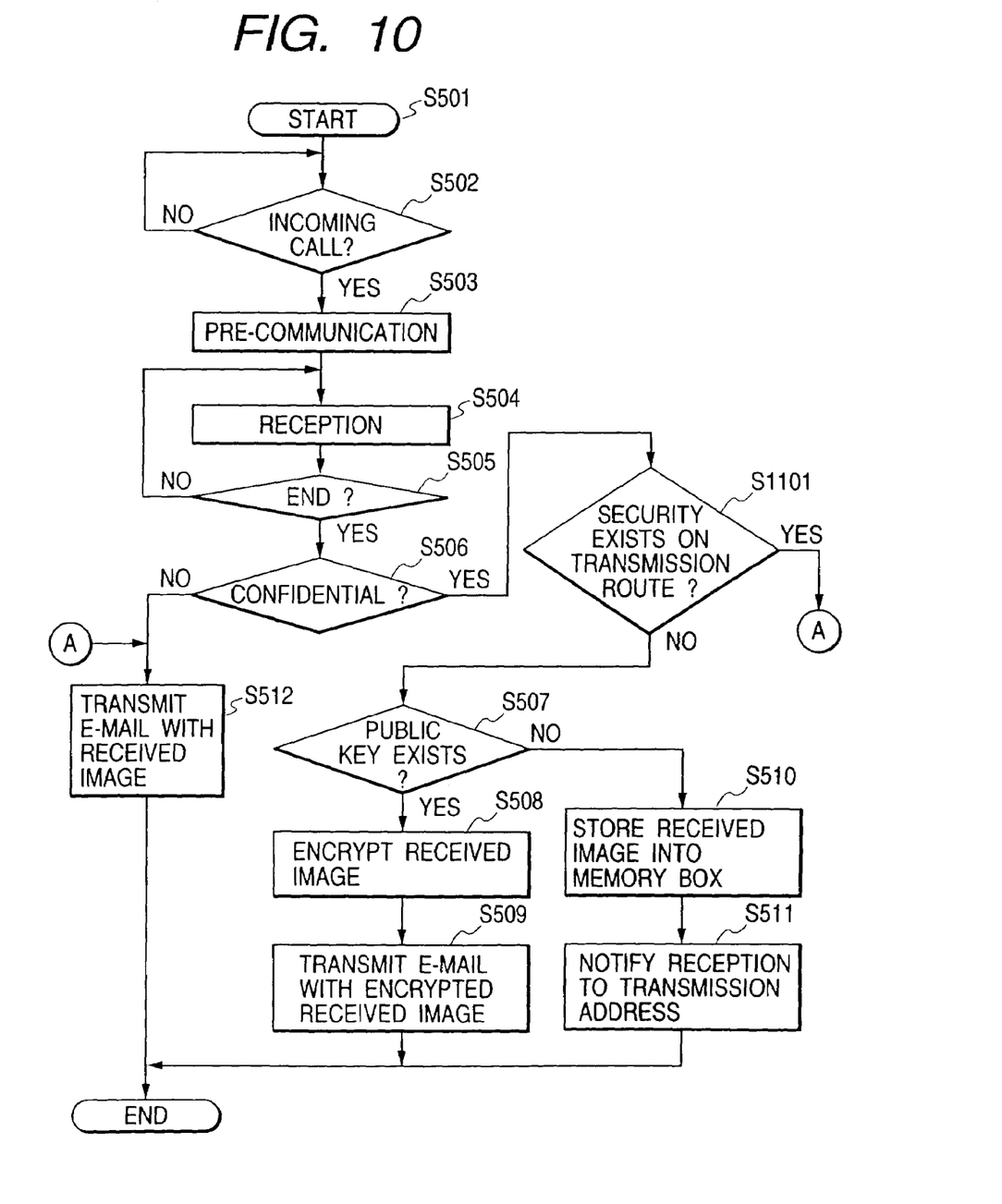
FIG. 10 is a flowchart showing the function of the communication apparatus in a fifth embodiment of the present invention.

At first, after the process of the step S511 in FIG. 10, there is executed, at a predetermined interval, a process of discriminating whether the public key of the destination corresponding to the confidential image stored in the memory box is registered in the address notebook (a loop process consisting of steps S1001 and S1002), and if the step S1001 detects the affirmative discrimination in such loop process, the sequence proceeds to a step S508 for transferring the confidential image with encryption by the registered public key.

Also the message to be transmitted in the step S511 can be, for example, "A confidential image is received in your memory box. The confidential image will be encrypted and transmitted if you send your public key".

Fifth Embodiment

The foregoing third embodiment does not execute the image transfer unless the public key of the destination is acquired, but, in the present embodiment, the encrypted transfer is executed depending on the security of the transfer path. More specifically, in the transfer through the LAN 203, there is discriminated whether the public key of the destination of transfer is acquired or not only in case the security of the transfer path is not ensured, and, if the public key is discriminated to be present, the confidential image is encrypted and transferred, but, if absent, the confidential image is stored in the memory box and a message indicating such image storage alone is transmitted to the destination. Also in the case where security of the transfer path is ensured, the confidential image is transferred to the destination regardless whether the public key of the destination of transfer is acquired or not.

In this manner, the process relating to the public key data can be dispersed to the destinations within a domain with ensured security such as an intranet, whereby the process of registered data management in the communication apparatus 201 can be alleviated.

In the following, the function of the communication apparatus 201 in the present embodiment will be explained with reference to a flowchart shown in FIG. 10, which is a modification of the flowchart of the third embodiment shown in FIG. 5, and in which any step of a similar number as in the third embodiment has the same content. In the following there will only be an explanation of the steps of which processes are different from the third embodiment.

At first, if the step S506 identifies that the received image data represent a confidential image, the sequence proceeds to a step S1101. A step S1101 judges the security of the transfer path to the destination of transfer corresponding to the sub-address received in the step S503, and, if the transfer path is judged secure, the sequence proceeds to a step S512 for transferring the confidential image to the destination.

On the other hand, if the transfer path is judged not secure, the sequence proceeds to a step S507 for determining whether to transfer the confidential image or to store it in the memory box, according to the presence or absence of the public key. The judgment of the security of the transfer path in the step S1101 can be made, for example, by the domain of the e-mail address of the communication apparatus 210 and the domain of the e-mail address of the destination of transfer.

Such judgment will be explained in more detail with reference to FIGS. 6 and 7. As explained in the foregoing, the communication apparatus 201 is provided with an e-mail client function, for example with an e-mail account "fax@xxx.xxx.com".

Consequently, in the example of the address notebook data shown in FIG. 7, the destinations aaa, bbb and ccc are in the same domain "xxx.xxx.com" of the communication apparatus 201 while the destinations ddd and eee are in domains different from that of the communication apparatus 201.

Therefore, for the destinations of transfer belonging to the domain of the communication apparatus 201, the confidential image is transferred by the e-mail regardless whether the public key is registered in the address notebook.

For the destination in a domain different from that of the communication apparatus 201, the transfer is executed according to whether the public key is registered in the address notebook. More specifically, since the public key is not registered for the destination ddd, the confidential image for the destination ddd is stored in the memory box and the e-mail describing only a message indicating the storage of the confidential image in the memory box is transmitted to the destination ddd. Also as the public key is registered for the destination eee, the e-mail with the confidential image encrypted with the public key is transmitted to the destination eee.

The domain name has a hierarchic layered structure punctuated by dots, and the judgment of a same domain by the coincidence of a number of hierarchic layers starting from the first layer "com" depends on the security policy of the network system. For example the transfer path may be judged secure by the coincidence up to the second hierarchic layer "xxx.com".

In the foregoing there has been explained the judgment based on the domain name, but the security may also be judged by whether the subset of the IP address of the destination of transfer is within a predetermined sub-net.

Sixth Embodiment

Certain public keys are rendered effective only during a period, in order to improve the security. The present embodiment, utilizing such a public key as will be explained in the following with reference to FIG. 11.

Figure 11:
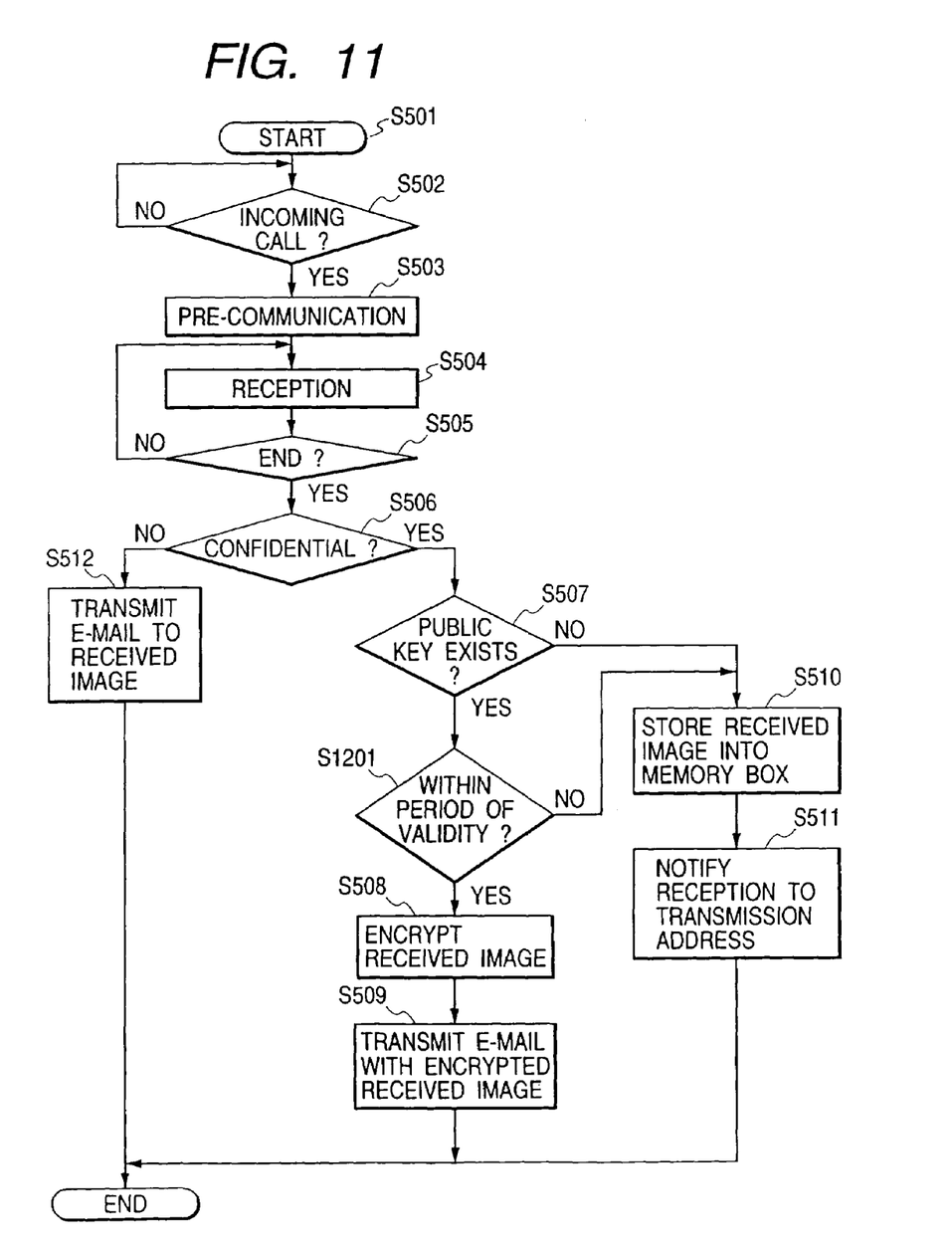
FIGS. 11 and 12 are flowcharts showing the function of the communication apparatus in a sixth embodiment of the present invention.

A flowchart shown in FIG. 11 is a modification of the flowchart of the third embodiment shown in FIG. 5, and any step of a similar number as in the third embodiment has same the content. In the following, there will only be an explanation of the steps of which processes are different from the third embodiment.

At first, if the step S506 identifies that the received image data represent a confidential image, a step S507 discriminates, based on the management table shown in FIG. 6 and the address notebook shown in FIG. 7, whether the public key is correlated with the e-mail address corresponding to the subaddress received in the step S503. If the step S507 identifies that the public key is not correlated, a step S1201 discriminates whether the public key is within an effective period.

In the step S1201, identifying that the public key is within the effective period, a step S508 encrypts the received image data with the public key, and a step S509 transmits an e-mail with thus encrypted confidential image.

If the step S1201 identifies that the effective period of the public key has expired, a step S510 stores the received image data in the memory box corresponding to the sub-address and a step S511 transmits, to the e-mail address corresponding to the sub-address, an e-mail describing, as the text data, a message that the confidential image is stored in the memory box. Such message can be, for example, "Effective period of the public key has expired. A confidential image is received in your memory box. Please come to receive it".

It is also possible, in response to the renewal of the effective period of the public key, to automatically encrypt the confidential image with such public key and transfer the encrypted image to the destination.

The function of the communication apparatus in such case will be explained with reference to a flowchart shown in FIG. 12, which is a modification of the flowchart of the third embodiment, and in which any step of a similar number as in the third embodiment has the same content. In the following there will only be an explanation of the steps of which processes are different from the third embodiment.

Figure 12:
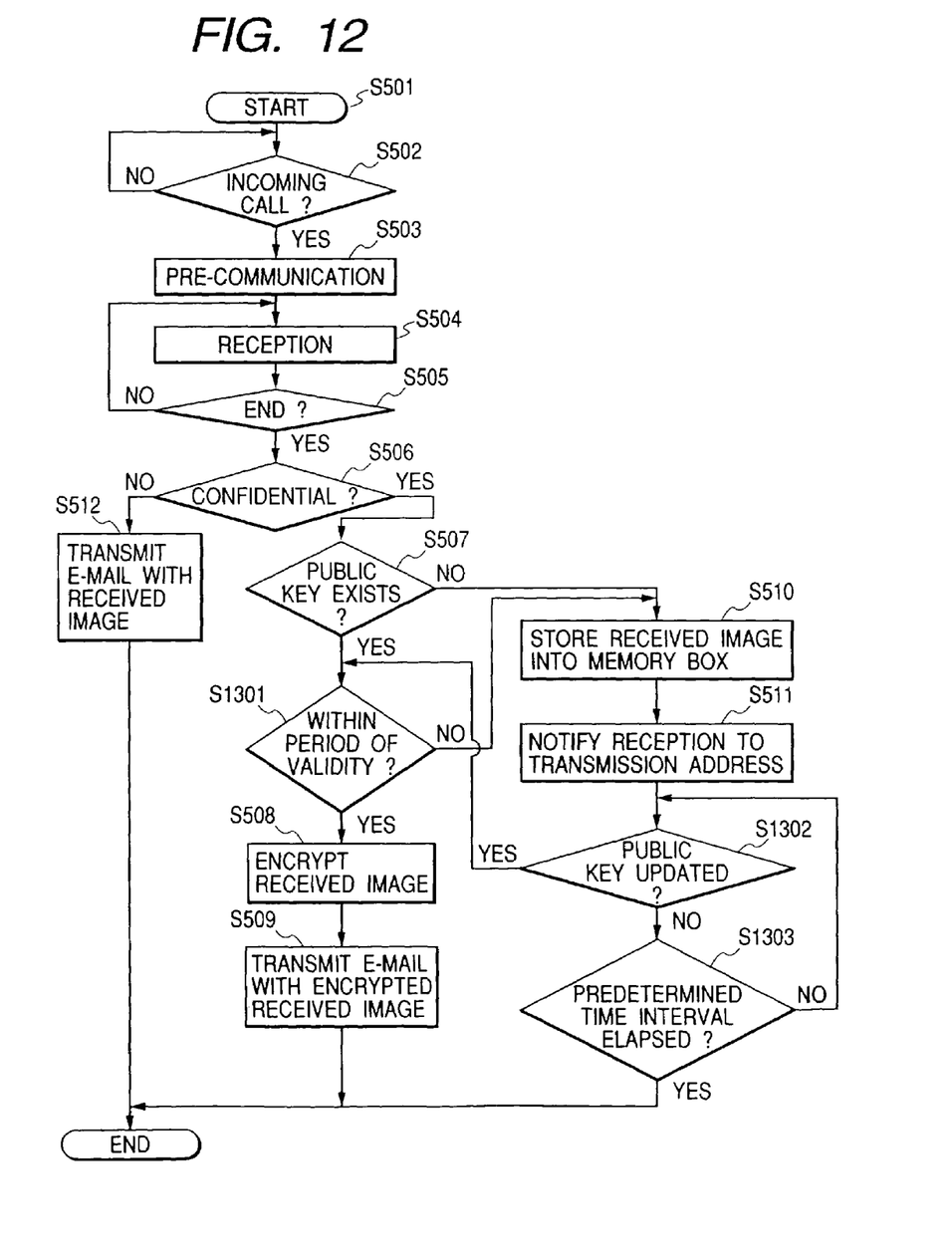

At first, after the process of the step S511 in FIG. 12, a step S1304 executes, at a predetermined interval, a process of discriminating whether the effective period of the public key of the destination corresponding to the confidential image stored in the memory box is renewed (a loop process consisting of steps S1302 and S1303), and if the step S1302 detects the affirmative discrimination in such loop process, a step S1301 discriminates whether the renewed period is effective.

If the step S1301 identifies that the public key is within the effective period, a step S508 encrypts the received image data with such public key, and a step S509 transfers the encrypted confidential image by the e-mail.

Also the message to be transmitted in the step S511 can be, for example, "The effective period of the public key has expired. A confidential image is received in your memory box. The confidential image will be encrypted and transmitted if you renew the effective period of your public key".

In the foregoing there has been explained a case of renewing the effective period of the public key, but it is also possible to encrypt and transfer the confidential image stored in the memory box in response to the new acquisition of a public key in the effective period from the destination of transfer.

Seventh Embodiment

Figure 8:
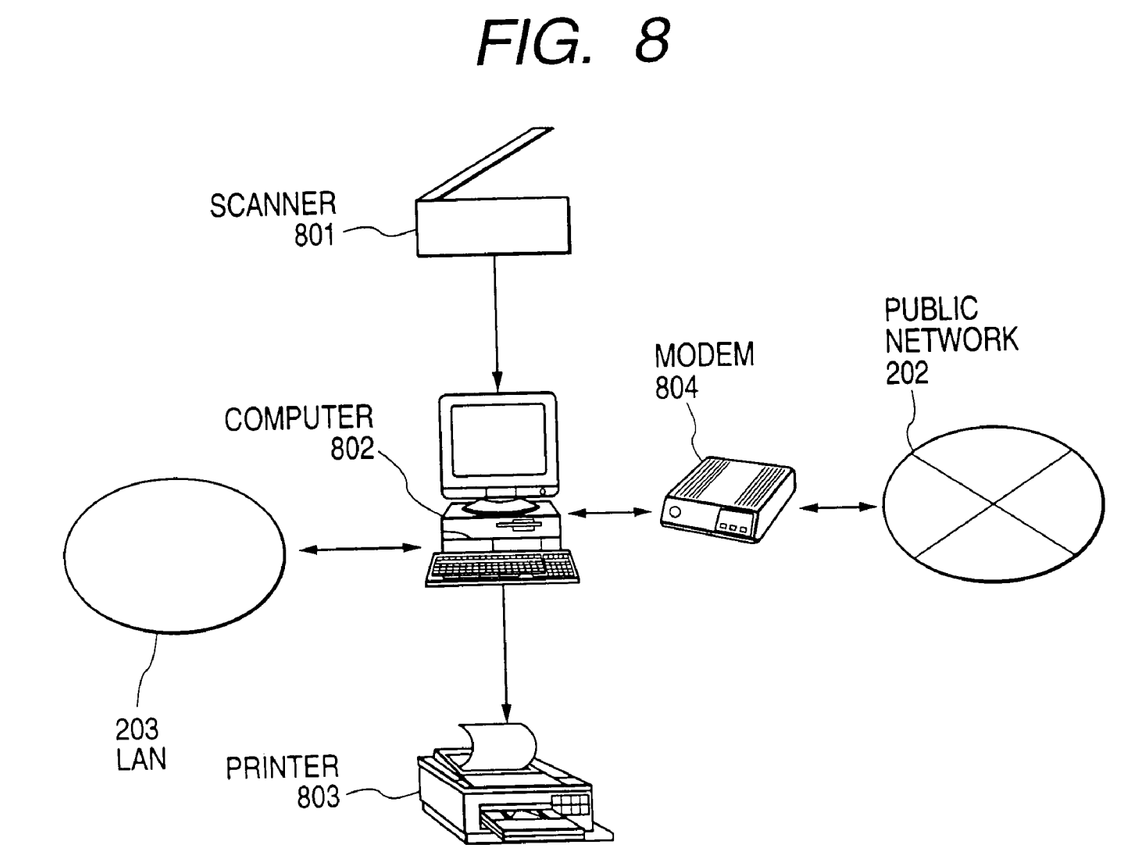
FIG. 8 is a view showing the configuration of a communication system in a sixth embodiment of the present invention.

The foregoing embodiments have been explained by the function of a single equipment constructed as the communication apparatus, but the present invention may also be applied to a system consisting of plural equipment such as a personal computer, a modem, a scanner, a printer, etc. The configuration of such system will be briefly explained with reference to FIG. 8. Referring to FIG. 8, a personal computer (PC) 802 is connected to a scanner 801, a printer 803 and a modem 804 (which may be incorporated in the PC 802) through a predetermined interface. The PC 802 is also connected to a public network 202 through the modem 804 and to a LAN 203 through an unrepresented LAN board.

The interface connecting the PC 802 with the scanner 801, printer 803 and modem 804 may be a network interface through the LAN 203, but is preferably a local interface separated from the LAN 203, such as USB, in order to handle the secret data such as the confidential image.

In the following, there will be explained the receiving operation in this system. At first, a signal transmitted from the public network 202 is fetched into the modem 804 through a NCU unit incorporated therein. The modem 804 demodulates the analog signal to restore the digital data. The digital data are read by a computer 802 in which image data are restored by decompression of the compressed data and are supplied to a printer 803, which prints the image data.

If the received image data are confidential, the data are stored in a memory box of a hard disk device incorporated in the PC 802, and, according to the aforementioned third embodiment, the confidential image is transferred with encryption by the public key to the destination of which the public key is acquired while the e-mail indicating the reception of the confidential image is transmitted to the destination of which the public key is not acquired.

In the foregoing first to seventh embodiments, there has been explained a configuration in which the sub address received from the transmitting side is converted by the communication apparatus of the present invention into the e-mail address, but the e-mail address of the destination of transfer may be directly set in the sub-address from the transmitting side.

Also in the foregoing embodiments, there has been explained a case of transferring the image data, received from the public network 202, to the client device on the LAN 203, but such configuration is not restrictive and there may be assumed a configuration in which the LAN 203 is connected to the internet through a predetermined access point and the image data received from the public network 202 is transferred through the internet. The present invention is suitable for the communication through the internet since the security is considered important in such communication.

The present invention is also applicable to a case in which the image data received from the public network is transferred by dial-up connection to the access point of the internet from the public network.

Also the present invention is naturally applicable to a case where the present invention is realized by a supplying program to a system or an apparatus. In such case, the objects of the present invention can be attained by a computer (PCU or MPU) of such system or apparatus, reading and executing the program codes stored in a memory medium and realizing the present invention.

Also the present invention naturally includes a case where, in executing the read program codes by the computer, an OS (operating system) functioning on the computer executes a part of the processes.

What is claimed is:

1. A communication apparatus for transferring image data from a first network to a second network, wherein the communication apparatus transfers the image data to a destination on the second network by using one of a plurality of transfer paths that are on the second network, said apparatus comprising:
a reception unit configured to receive image data via a first network;
a first discrimination unit configured to discriminate if the received image data is confidential or not;
a judgment unit configured to judge if security of each transfer path to the destination of the received image data via the second network is ensured or not, when the result of the discrimination by said first discrimination unit indicates the received image data is confidential;
a first control unit configured to control, when the result of the discrimination by said first discrimination unit indicates the received image data is not confidential, to transfer the received image data to the destination of the received data via the second network regardless of whether security of the transfer path to the destination of the received image data via the second network is ensured or not; and
a second control unit configured to control, when the result of the discrimination by said first discrimination unit indicates the received image data is confidential, to transfer the received image data to the destination of the received data via the second network when the result of the judgment by said judgment unit indicates security of the transfer path is ensured, and to store the received image data in a storage area corresponding to the destination of the received image data without transferring the received image data to the destination when the result of the judgment by said judgment unit indicates security of the transfer path is not ensured.

2. An apparatus according to claim 1, further comprising:
a management unit configured to manage address of the destination in relation with whether there exists a public key;
a second discrimination unit configured to discriminate whether there exists the public key related to the address of the destination, if said judgment unit judges that the transfer path is not secure;
an encrypting unit configured to encrypt the received image data, if said second discrimination unit discriminates that there exists the public key; and
a transmission unit configured to transmit the received image data encrypted by said encrypting unit to the destination.

3. An apparatus according to claim 1, further comprising a transmission unit configured to transmit information to the destination of the received data in a case where the received image data is stored in a storage area, the information indicating that the received image data is stored in the storage area.

4. A control method for a communication apparatus for transferring image data from a first network to a second network, wherein the communication apparatus transfers the image data to a destination on the second network by using one of a plurality of transfer paths that are on the second network, said method comprising:
receiving image data via a first network;
discriminating if the received image data is confidential or not;
judging if security of each transfer path to the destination of the received image data via the second network is ensured or not, when the result of the discrimination indicates the received image data is confidential;
controlling, when the result of the discrimination indicates the received image data is not confidential, to transfer the received image data to the destination of the received data via the second network regardless of whether security of the transfer path to the destination of the received image data via the second network is ensured or not; and
controlling, when the result of the discrimination indicates the received image data is confidential, to transfer the received image data to the destination of the received data via the second network when the result of the judgment indicates security of the transfer path is ensured, and to store the received image data in a storage area corresponding to the destination of the received image data without transferring the received image data to the destination when the result of the judgment indicates security of the transfer path is not ensured.

5. A storage medium computer-readably storing a program for causing a computer to execute a control method for a communication apparatus for transferring image data from a first network to a second network, wherein the communication apparatus transfers the image data to a destination on the second network by using one of a plurality of transfer paths that are on the second network, said method comprising:
receiving image data via a first network;
discriminating if the received image data is confidential or not;
judging if security of each transfer path to the destination of the received image data via the second network is ensured or not, when the result of the discrimination indicates the received image data is confidential;
controlling, when the result of the discrimination indicates the received image data is not confidential, to transfer the received image data to the destination of the received data via the second network regardless of whether security of the transfer path to the destination of the received image data via the second network is ensured or not; and controlling, when the result of the discrimination indicates the received image data is confidential, to transfer the received image data to the destination of the received data via the second network when the result of the judgment indicates security of the transfer path is ensured, and to store the received image data in a storage area corresponding to the destination of the received image data without transferring the received image data to the destination when the result of the judgment indicates security of the transfer path is not ensured.

\* \* \* \* \*